G. W. N. Yost,
Mower.
No. 88,533.      Patented Mar. 30, 1869.
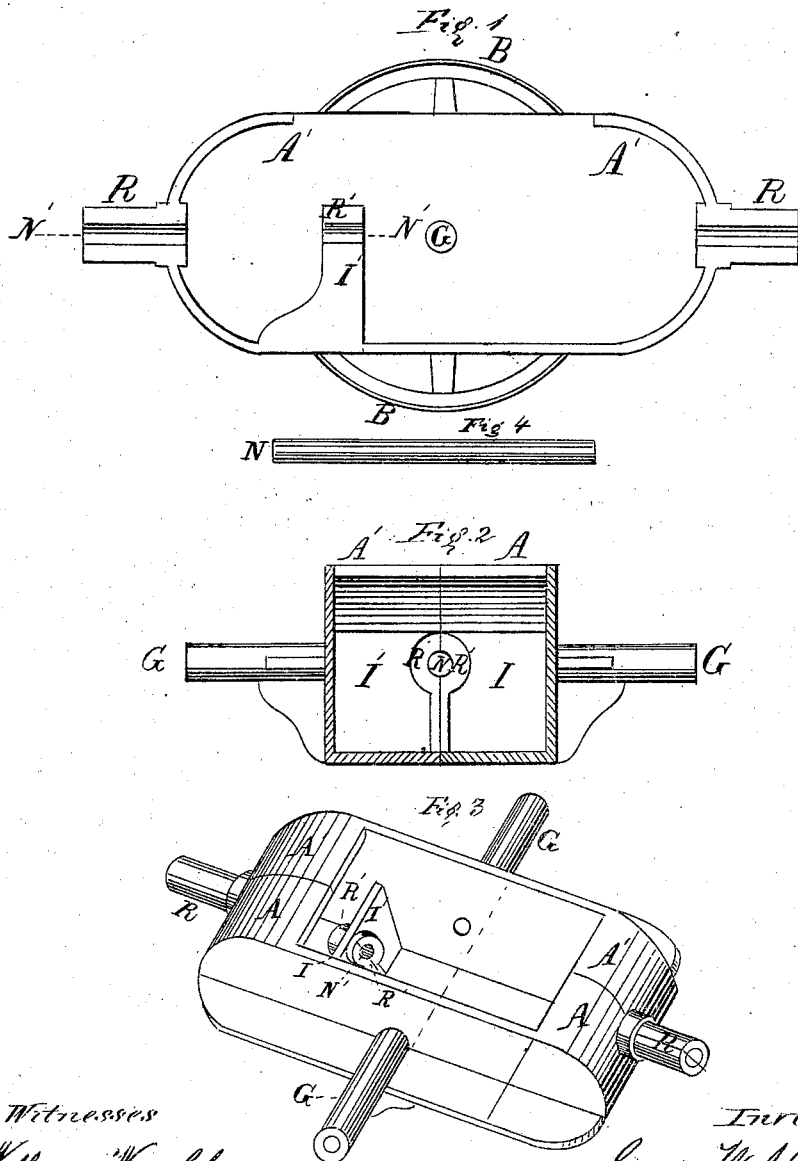

UNITED STATES PATENT OFFICE.

GEORGE W. N. YOST, OF CORRY, PENNSYLVANIA.

IMPROVEMENT IN HARVESTERS.

Specification forming part of Letters Patent No. 88,533, dated March 30, 1869.

*To all persons interested:*

I, GEORGE W. N. YOST, of Corry, Pennsylvania, have invented a Climax Pinion-Shaft Bearing, an improvement on my climax-body for grass and grain cutting machines.

The accompanying drawings, with the following description, having like specifying-letters referring to the same parts, fully illustrate the invention.

A and A' are cases of my climax-body, as described in my patent of August 18, 1868. R is a cylinder, about four inches long and thick, projecting from one or each end of the body A and A'. I and I' are webs across the body, inside, about eight inches from one end, cast with or made a solid part of the cases A and A', one to each, about half an inch thick and seven inches high, and wide as the bottom of each case, meeting and joining at the middle, and practically making only one web or flange. R' is a cylinder or hub within, and a solid part of the web or webs I and I' of the body A and A', on the same line and about the same size as the cylinder R. N' is a hole lengthwise through the hub R' and the cylinder R of the body A and A', for gudgeon-boxes. N is a pinion and pitman shaft, to go through and revolve within the holes or gudgeon-boxes N'.

The object of the invention is a simple, solid, cheap bearing or gudgeon-box for the inner end of the pinion and pitman shaft; and the nature of the invention is to make a solid part of the body itself, A and A', serve as the gudgeon-box or bearing R, provided with the hole N'.

Formerly I used a support-bolt or a yoke-bolt, as described in my patents of 1868; but either of those devices is much more complex and costly to make, and no better when made, than this invention.

Therefore I claim—

Combining or providing a body or main frame, or cases A and A', with flanges or webs or web I and I', having a hole, N', through said flanges or webs or web, for a gudgeon-box for an inner end of a pinion and crank-shaft or other gudgeon, as described, for grass and grain cutting machines.

G. W. N. YOST.

Witnesses:
  H. L. WYMAN,
  JAMES DENSMORE.